United States Patent

Tamai et al.

Patent Number: 4,959,440
Date of Patent: Sep. 25, 1990

[54] POLYIMIDE FOR HIGH-TEMPERATURE ADHESIVE

[75] Inventors: Shoji Tamai, Yokohama; Saburo Kawashima, Yokosuka; Yoshiho Sonobe, Yokohama; Masahiro Ohta, Yokohama; Hideaki Oikawa, Yokohama; Akihiro Yamaguchi, Kamakura, all of Japan

[73] Assignee: Mitsui Toatsu Chemicals, Inc., Tokyo, Japan

[21] Appl. No.: 6,513

[22] Filed: Jan. 23, 1987

[51] Int. Cl.$^5$ ............... C08G 8/02; C08G 14/00
[52] U.S. Cl. ..................... 528/125; 528/128; 528/172; 528/185; 528/353
[58] Field of Search ............. 528/125, 172, 128, 185, 528/353

[56] References Cited

U.S. PATENT DOCUMENTS

| | | | |
|---|---|---|---|
| 3,502,762 | 3/1970 | Haller | 528/125 |
| 4,316,844 | 2/1982 | Waitkus et al. | 528/125 |
| 4,820,791 | 4/1989 | Horgenrother et al. | 528/125 |

OTHER PUBLICATIONS

Polyimide Structure-Property Relationships, 111, Polymides from Multi-Ring Diamines; Tsell et al. Journal of Applied Polymer Science, vol. 26, 3805–3817.

*Primary Examiner*—Morton Foelak
*Assistant Examiner*—P. Hampton Hightower
*Attorney, Agent, or Firm*—Fisher, Christen & Sabol

[57] ABSTRACT

This invention relates to a novel polyimide and describes method of its preparation, adhesives of the polyimide and the method for their application.

The polyimide has recurring units of the formula

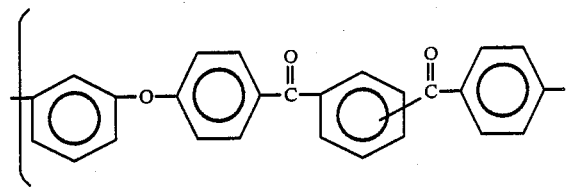

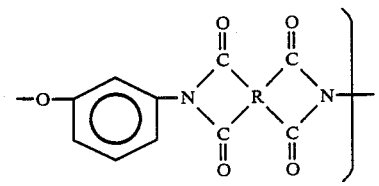

(where the positions of two carbonyl radicals in a benzene ring are meta or para, and R is a tetra-valent radical selected from the group consisting of aliphatic radical having not less than two carbons, cyclo-aliphatic radical, monoaromatic radical, condensed polyaromatic radical, and non condensed polyaromatic radical wherein aromatic radicals are mutually connected with a bond or a crosslinking function).

The polyimide can be prepared by reacting diamine with tetracarboxylic dianhydride in organic solvents and imidizing resultant polyamic acid.

The diamine in use is ether diamine and includes 1,3-bis[4-(3-aminophenoxy)benzoyl]benzene and 1,4-bis[4-(3-aminophenoxy)benzoyl]benzene.

Various tetracarboxylic dianhydrides can be used and particularly prefered are pyromellitic dianhydride and 3,3',4,4'-benzophenonetetracarboxylic dianhydride.

9 Claims, 2 Drawing Sheets

FIG. 2

POLYMIDE FOR HIGH-TEMPERATURE ADHESIVE

BACKGROUND OF THE INVENTION

This invention relates to a novel polyimide, method for preparing the same and high-temperature adhesives of the same.

This invention particularly relates to adhesives having excellent adhesive strength and high-temperature stability.

Various kinds of adhesives are so far known concerning organic synthetic high polymers. Polybenzimidazole and polyimide type adhesives have been developed as those having outstanding stability at high temperatures. Besides other adhesives have also been developed from fluoro resin, polyamideimide, silicone, epoxy novolac, epoxy acryl, nitril rubber phenolics and polyester.

The properties of these adhesives are not yet satisfactory because good high-temperature stability causes low adhesive strength while high adhesive strength results in poor high-temperature stability.

Therefore an object of this invention is to provide a novel polyimide for use as the adhesives having excellent bonding strength and durability at high-temperatures for a long period.

Another object of this invention is to provide a method for preparing the same and a method for adhesion by use of the same.

SUMMARY OF THE INVENTION

The inventors have examined hard to improve the bonding strength of adhesives at high temperatures and found a novel polyimide derived from new ether diamines.

The present invention is summarized as follows.

(1) Polyimide having recurring units of the formula (where the positions of two carbonyl radicals in a benzene ring are meta or para, and R is a tetra-valent radical selected from the group consisting of aliphatic radical having not less than two carbons, cyclo-aliphatic radical, monoaromatic radical, condensed polyaromatic radical, and non condensed polyaromatic radical wherein aromatic radicals are mutually connected with a bond or a crosslinking function).

(2) A method for preparing polyimide having recurring units of the formula

(where the positions of two carbonyl radicals, and R are same as above), which comprises reacting a diamine having the formula

(where the positions of two carbonyl radicals are same as above) with a tetracarboxylic dianhydride having the formula (where R is the same as above) in an organic solvent, and thermally or chemically imidizing resultant polyamic acid having recurring units of the formula (3) A high-temperature adhesive of polyimide having recurring units of the formula

(where the positions of two carbonyl radicals, and R are the same as above).

(4) A method for adhesion which comprises applying polyimide having recurring units of the formula (where the positions of two carbonyl radicals, and R are the same as above) on a substrate, overlapping the applied surface of the substrate with untreated or applied surface of another substrate, and heating under pressure above the glass transition temperature of said polyimide.

(5) A method for adhesion which comprises applying polyamic acid having recurring units of the formula (where the positions of two carbonyl radicals, and R are the same as above) which is a precursor of polyimide, on a substrate, imidizing to give polyimide having recurring units of the formula and overlapping the applied surface of the substrate with untreated or applied surface of another substrate, followed by heating under pressure above the glass transition temperature of said polyimide.

DETAILED DESCRIPTION OF THE INVENTION

A novel polyimide of this invention having recurring units of the formula

(where the positions of two carbonyl radicals in a benzene ring are meta or para, and R is a tetra-valent radical selected from the group consisting of aliphatic radical having not less than two carbons, cyclo-aliphatic radical, monoaromatic radical, condensed polyaromatic radical, and non condensed polyaromatic radical wherein aromatic radicals are mutually connected with a bond or a crosslinking function) can be prepared by reacting the following diamine with tetracarboxylic dianhydride in the organic solvents and further cyclizing the resultant polyamic acid by dehydration.

The diamine for use in this invention is 1,3-bis[4-(3-aminophenoxy)benzoyl]benzene having the formula or 1,4-bis[4-(3-aminophenoxy)benzoyl]benzene having the formula These ether diamines can be used singly or in mixtures.

Tetracarboxylic dianhydride for use in the method of this invention has the formula (where R is a tetra-valent radical selected from the group consisting of aliphatic radical having not less than two carbons, cycloaliphatic radical, monoaromatic radical, condensed polyaromatic radical, and non condensed polyaromatic radical wherein aromatic radicals are mutually connected wtih a bond or a crosslinking function).

Tetracarboxylic dianhydride used in the method includes, for example, ethylene tetracarboxylic dianhydride, cyclopentane tetracarboxylic dianhydride, pyromellitic dianhydride, 3,3',4,4'-benzophenone tetracarboxylic dianhydride, 2,2',3,3'-benzophenone tetracarboxylic dianhydride, 3,3',4,4'-biphenyl tetracarboxylic dianhydride, 2,2',3,3'-biphenyl tetracarboxylic dianhydride, 2,2-bis(3,4-dicarboxyphenyl)propane dianhydride, 2,2-bis(2,3-dicarboxyphenyl)propane dianhydride, bis(3,4-dicarboxyphenyl) ether dianhydride, bis(3,4-dicarboxyphenyl) sulfone dianhydride, 1,1-bis-(2,3-dicarboxyphenyl)ethane dianhydride, bis(2,3-dicarboxyphenyl)methane dianhydride, bis(3,4-dicarboxyphenyl)methane dianhydride, 2,3,6,7-naphthalene tetracarboxylic dianhydride, 1,4,5,8-naphthalene tetracarboxylic dianhydride, 1,2,5,6-naphthalene tetracarboxylic dianhydride, 1,2,3,4-benzene tetracarboxylic dianhydride, 3,4,9,10-perylene tetracarboxylic dianhydride, 2,3,6,7-anthracene tetracarboxylic dianhydride and 1,2,7,8-phenanthrene tetracarboxylic dianhydride.

Prefered in particular among these dianhydrides are pyromellitic dianhydride and 3,3',4,4'-benzophenonetetracarboxylic dianhydride.

Tetracarboxylic dianhydride can be used alone or in mixtures of two or more.

The polymer can be normally prepared by reacting ether diamine with tetracarboxylic dianhydride in the organic solvents. The organic solvents used in the reaction include, for example, N,N-dimethylformamide, N,N-dimethylacetamide, N,N-diethylacetamide, N,N-dimethylmethoxyacetamide, N-methyl-2-pyrrolidone, 1,3-dimethyl-2-imidazolidinone, N-methylcaprolactam, 1,2-dimethoxyethane, bis(2-methoxyethyl) ether, 1,2-bis(2methoxyethoxy)ethane, bis[2-(2-methoxyethoxy)ethyl] ether, tetrahydrofuran, 1,3-dioxane, 1,4-dioxane, pyridine, picoline, dimethyl sulfoxide, dimethyl sulfone, tetramethylurea and hexamethylphosphoramide. These solvents can be used alone or in mixtures of two or more.

The reaction temperature is normally 60° C. or less, preferably 50° C. or less. The reaction pressure is not restricted in particular and atmospheric pressure is sufficient for carrying out the reaction. The reaction time depends upon the type of solvents, reaction temperature, and raw materials such as diamines and tetracarboxylic dianhydrides, and is normally enough to complete the formation of polyamic acid represented by the undermentioned formula. Reaction for 4 to 24 hours is normally sufficient.

Such reaction affords polyamic acid having recurring units of the formula

In the next step, thermal dehydration of the polyamic acid solution at 100° to 300° C. or chemical dehydration by treating with imidizing agent such as acetic anhydride afford the corresponding polyimide having recurring units of the formula The method of applying the polymer thus obtained for adhesive is roughly divided into two procedures.
(1) The polymer is used as an adhesive solution containing said polyamic acid precursor as a main component, and imidized before adhesion.
(2) The polymer is used in the form of said polyimide as it is.

In the procedure (1), the adhesive solution is an organic solvent solution of polyamic acid. It may be the resultant reaction mixture of polyamic acid obtained by reacting ether diamine with tetracarboxylic dianhydride in the organic solvents. It also may be the solution containing polyamic acid as the main component and polyimide which is a cyclized product of polyamic acid. Thus the adhesive solution containing polyamic acid may be the solution or suspension containing polyimide as an auxiliary ingredient.

When applying the adhesive containing such polyamic acid, a thin layer of polyamic acid is formed on the adherends to be bonded, followed by preheating the coated adherends in air for a desired period at temperature of 180°-350° C., preferably 200°-300° C. Excess solvents are removed and the polyamic acid is converted to a more stable polyimide. The adherends are then strongly bonded by pressing under pressure of 1–1,000 kg/cm² at temperature of 50°–400° C., followed by curing at temperature of 100°–400° C.

In the procedure (2) wherein said polyimide is used for the adhesive, it is roughly divided into three cases.
(a) Said polyimide is used as powder as it is.
(b) Said polyimide is dissolved into the solvents or used in the form of resultant solution at the end of imidization.
(c) Said polyimide is previously formed to films before use.

In these cases, some of said polyamic acid may be contained in said polyimide.

In the case (a), the adherends can be strongly bonded by inserting the powder between the adherends, pressing under pressure of 1–1,000 kg/cm² at temperature of 50°–400° C. and curing at temperature of 100°–400° C.

In the case (b), the thin layer of polyimide containing solution adhesive is formed on the adherends to be bonded, followed by preheating the adherends in air for the desired period at about 30°–200° C. to remove the solvents. The coated adherends are assembled with other adherends, pressed under pressure of 1–1,000 kg/cm² at temperature of 50°–400° C. and cured at temperature of 100°–400° C. to give strongly bonded adherends.

EXAMPLES

The present invention will be illustrated with respect to the following Synthetic examples and Examples.

SYNTHETIC EXAMPLE 1

1,3-Bis[4-(3-aminophenoxy)benzoyl]benzene in use for this invention was prepared by the following process.

In a one liter reaction vessel 70 grams (0.22 mol) of 1,3-bis(4-fluorobenzoyl)benzene, 50.1 grams (0.46 mol) of m-aminophenol, 63.5 grams of anhydrous potassium carbonate and 550 ml of 1,3-dimethyl-2-imidazolidinone were charged and reactected for five hours at 150°-160° C. After ending the reaction, the reaction mixture was cooled to the room temperature and filtered to remove inorganic salt. The solvent was distilled off in vacuum from the filtrate. The residue was added with 60 grams of 35% hydrochloric acid, 850 grams of water and 150 grams of isopropyl alcohol, and dissolved by warming. The resultant solution was added with 50 grams of sodium chloride and cooled to 20°-25° C. The precipitated hydrochloride crystals were filtered, dissolved by warming into 600 ml of 50% aqueous isopropyl alcohol, stirred after adding five grams of active carbon, hot filtered and cooled. The separated crystals were filtered and the hydrochloride crystals thus obtained were dissolved by warming into a mixture of 750 grams of water and 350 grams of isopropyl alcohol, treated again with active carbon and neutralized with aqueous ammonia. The separated crystals were filtered, washed with water and dried to give 90.2 grams (82% yield) of 1,3-bis[4-(3-aminophenoxy)benzoyl]benzene as white crystals having a melting point of 147°-149° C. and the purity of 99.7% in accordance with high-speed liquid chromatography.

| ($C_{32}H_{24}N_2$) | Elementary | | |
|---|---|---|---|
| | C | H | N |
| Calculated (%) | 76.8 | 4.8 | 5.6 |
| Found (%) | 76.7 | 4.7 | 5.5 |

IR (KBr, $cm^{-1}$):
3450 and 3390 (amino group)
1630 and 1595 (carbonyl group)
1250 (ether linkage)

SYNTHETIC EXAMPLE 2

1,4-Bis[4-(3-aminophenoxy)benzoyl]benzene in use for this invention was prepared by the following process.

In a one liter reaction vessel 50 grams (0.16 mol) of 1,4-bis(4-fluorobenzoyl)benzene, 42 grams (0.39 mol) of m-aminophenol, 54 grams of anhydrous potassium carbonate and 400 ml of sulforane were charged and reacted at 150°-160° C. for six hours. After ending the reaction, the reaction mixture was poured into water to make a total volume of two liters. Then the separated crystals were filtered, washed with water and dissolved into 400 ml of 2-methoxyethanol with heating. The resultant solution was added with eight grams of active carbon, stirred, hot filtered and cooled. The separated crystals were filtered and recrystallized again from 2-methoxyethanol and active carbon to afford 60 grams (75% yield) of 1,4-bis[4-(3-aminophenoxy)benzoyl]benzene as pale brown crystals having a melting point of 161°–163° C. and the purity of 99.3% in accordance with high-speed liquid chromatography.

| Elementary analysis ($C_{32}H_{24}N_2$) | | | |
| --- | --- | --- | --- |
| | C | H | N |
| Calculated (%) | 76.8 | 4.8 | 5.6 |
| Found (%) | 76.4 | 4.72 | 5.5 |

IR (KBr, $cm^{-1}$):
3420 (amino group)
1640 and 1595 (carbonyl group)
1245 (ether linkage)

EXAMPLE 1

A reaction vessel equipped with a stirrer, reflux condenser and nitrogen inlet tube was charged with 50 grams (0.1 mol) of 1,3-bis[4-(3-aminophenoxy)benzoyl]benzene and 215.4 grams of N,N-dimethylacetamide, cooled to about 0° C. and added with 17.44 grams (0.08 mol) of pyromellitic dianhydride by four portions under nitrogen atmosphere with care not to raise the temperature of the solution. After stirring for about two hours at approximately 0° C., the temperature of reaction solution was raised to the room temperature. The 4.36 grams (0.02 mol) of pyromellitic dianhydride were added under nitrogen atmosphere and successively stirred for 20 hours under nitrogen atmosphere.

The polyamic acid thus obtained had an inherent viscosity of 1.82 dl/g at 35° C. in 0.5% N,N-dimethylacetamide solution.

In the next step, a vessel equipped with a stirrer, reflux condenser and nitrogen inlet tube was charged with 200 grams of above polyamic acid solution and 300 grams of N,N-dimethylacetamide. The mixture was added dropwise with 28.4 grams (0.28 mol) of acetic anhydride and 10.5 grams (0.104 mol) of triethylamine with stirring under nitrogen atmosphere at the room temperature and further stirred for 20 hours. After ending the reaction, the precipitate was filtered, washed with methanol and dried in a reduced pressure at 150° C. for eight hours to afford 45.8 grams (96.5% yield) of polyimide as light yellow powder. The powder had a glass transition temperature of 228° C. in accordance with DSC method and a five percent weight decrease temperature of 522° C. in accordance with DTA-TG.

Figure 1:
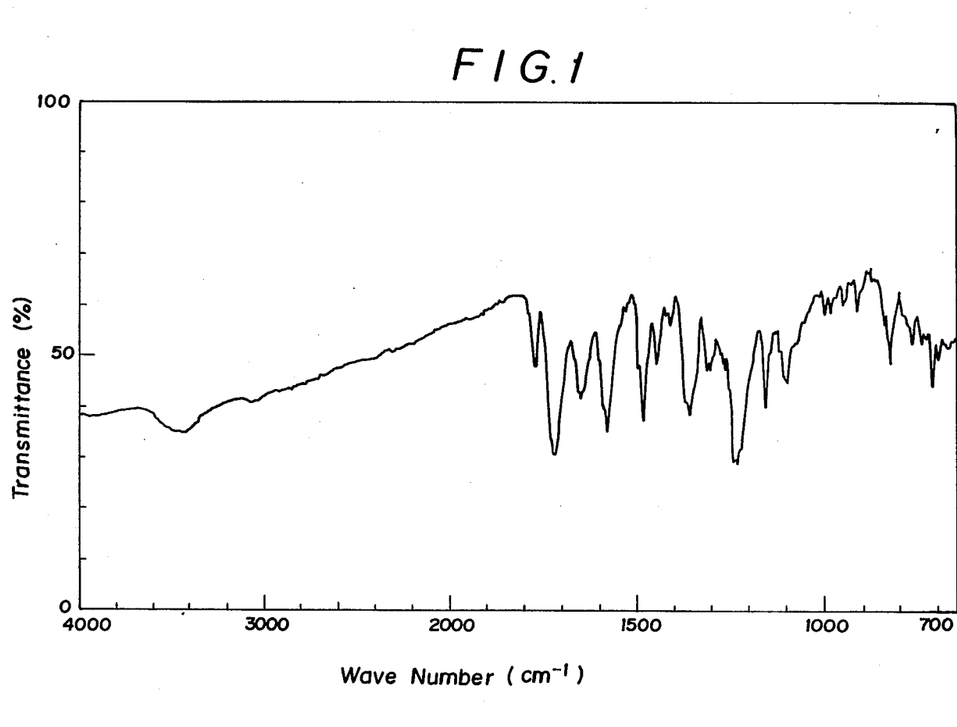
FIGS. 1 and 2 are IR absorption spectrum atlas of the polyimide in two Examples of this invention.

The IR absorption spectrum atlas of polyimide powder thus obtained is shown in FIG. 1. In the spectrum atlas, remarkable absorption bands were found at around 1780 $cm^{-1}$ and 1720 $cm^{-1}$ which are characteristic absorption of imide and around 1240 $cm^{-1}$ which is the characteristic absorption of ether linkage.

The polyimide powder was applied on a cold rolled steel panel (JIS G3141, spcc/SD, 25×100×1.6 mm) which was washed with trichloroethylene and preheated at 130° C. The coated panel was overlapped with another cold rolled steel panel and pressed at 320° C. for five minutes with the pressure of 20 kg/$cm^2$.

The lap shear strength of bonded specimen was 330 kg/$cm^2$ at the room temperature and 200 kg/$cm^2$ at 240° C. in accordance with JIS K6848 and 6850.

In addition, above polyamic acid solution was applied on a cold rolled steel panel which was previously washed with trichloethylene, and dried for one hour each at 100° C. and 220° C. The coated panel was overlapped with another cold rolled steel panel and pressed at 320° C. for five minutes with the pressure of 20 kg/$cm^2$. The thickness of coated adhesive was 36 microns. The lap shear strength of bonded specimen was 330 kg/$cm^2$ at the room temperature and 200 kg/$cm^2$ at 240° C.

Besides above polyamic acid solution was casted on a glass plate and heated for one hour each at 100° C., 200° C. and 300° C.

The polyimide film thus obtained has a glass transition temperature of 230° C. in accordance with TMA penetration method and a five percent weight decrease temperature of 520° C.

The polyimide film was inserted between cold rolled steel panels which were preheated at 130° C. and pressed at 320° C. for five minutes with the pressure of 20 kg/$cm^2$.

The lap shear strength of bonded specimen was 320 kg/$cm^2$ at the room temperature and 200 kg/$cm^2$ at 240° C.

EXAMPLE 2

The same reaction vessel as Example 1 was charged with 50 grams (0.1 mol) of 1,3-bis[4-(3-aminophenoxy)benzoyl]benzene and 246.6 grams of N,N-dimethylacetamide, cooled to about 0° C. and added with 25.76 grams (0.08 mol) of 3,3',4,4'-benzophenonetetracarboxylic dianhydride by four portions with care not to raise the temperature of the reaction solution. After stirring for about two hours at approximately 0° C., the temperature of reaction solution was raised to the room temperature. Then 6.44 grams (0.02 mol) of 3,3',4,4'-benzophenonetetracarboxylic dianhydride were added under nitrogen atmosphere and successively stirred for 20 hours under nitrogen atmosphere.

The polyamic acid thus obtained had an inherent viscosity of 1.20 dl/g.

The polyamic acid solution was casted on a glass plate and heated for one hour each at 100° C., 200° C. and 300° C.

The polyimide film thus obtained had a glass transition temperature of 215° C. and a five percent weight decrease temperature of 532° C. The film also had a tensile strength of 1600 kg/$cm^2$ and an elongation at break of 68% at 23° C.

The press-bonded specimen of cold rolled steel panels prepared by use of the film and by the same method as Example 1 had a lap shear strength of 330 kg/$cm^2$ at the room temperature and 210 kg/$cm^2$ at 240° C.

EXAMPLE 3

The procedure of Example 1 was repeated except 1,4-bis[4-(3-aminophenoxy)benzoyl]benzene was used in place of 1,3-bis[4-(3-aminophenoxy)benzoyl]benzene. The polyamic acid thus obtained had an inherent viscosity of 1.25 dl/g.

The above polyamic acid adhesive solution was applied on two cold rolled steel panels which were previously washed with trichloroethylene and dried for one hour each at 100° C. and 220° C.

The coated surfaces of these steel panels were assembled together and pressed at 320° C. for five minutes with the pressure of 20 kg/$cm^2$.

The bonded specimen had a lap shear strength of 290 kg/$cm^2$ at the room temperature and 180 kg/$cm^2$ at 240° C.

Beside the polyamic acid was treated by the same procedure as in Example 1. The polyimide film obtained had a glass transition temperature of 238° C. and a five percent weight decrease temperature of 520° C.

11

The press-bonded specimen of cold rolled steel panels prepared by use of the film and by the same conditions as Example 1 had a lap shear strength of 285 kg/cm$^2$ at the room temperature and 180 kg/cm$^2$ at 240° C.

EXAMPLE 4

The procedure of Example 2 was repeated except 1,4-bis[4-(3-aminophenoxy)benzoyl]benzene was used in place of 1,3-bis[4-(3-aminophenoxy)benzoyl]benzene. The polyamic acid thus obtained had an inherent viscosity of 1.05 dl/g.

In the next step, a vessel equipped with a stirrer, reflux condenser and nitrogen inlet tube was charged with 200 grams of polyamic acid solution obtained above and 300 grams of N,N-dimethylacetamide. The mixture was added dropwise with 24.48 grams (0.24 mol) of acetic anhydride and 9.09 grams (0.09 mol) of triethylamine with stirring under nitrogen atmosphere at the room temperature and further stirred for 20 hours. After ending the reaction, the reaction mixture was poured into 500 grams of methanol. The precipitate was filtered, washed with methanol and dried under reduced pressure at 150° C. for eight hours to afford 45.0 grams (95.5% yield) of polyimide as light yellow power. The powder had a glass transition temperature of 212° C. and a five percent weight decrease temperature of 520° C.

Figure 2:
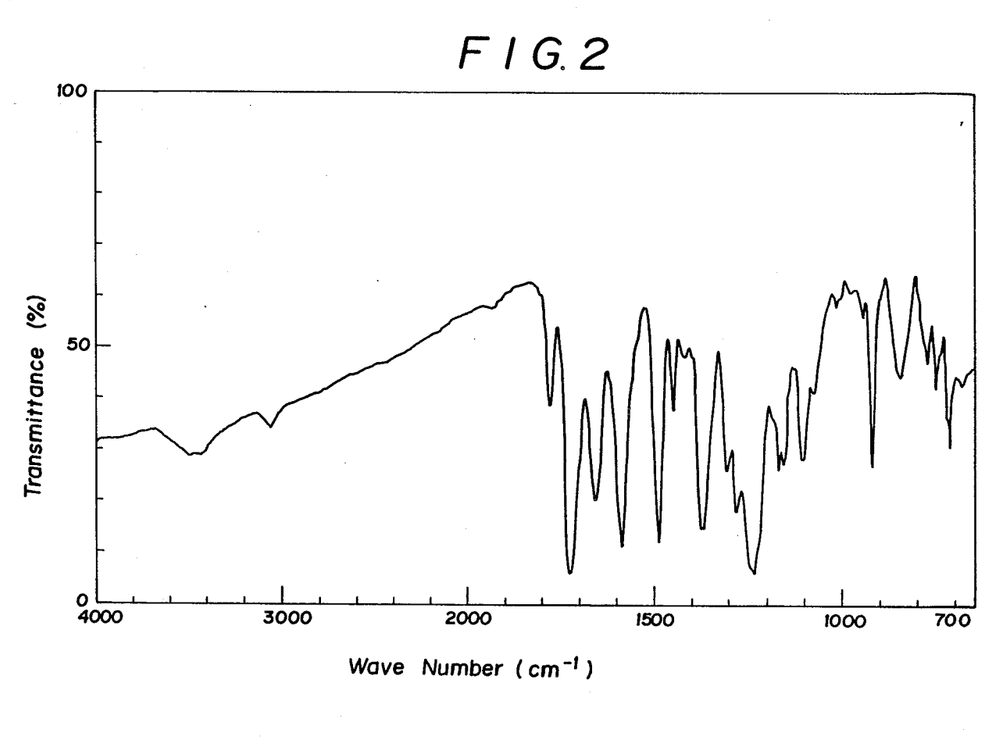

The IR absorption spectrum atlas of polyimide powder thus obtained is shown in FIG. 2. In the spectrum atlas, remarkable absorption bands were found at around 1780 cm$^{-1}$ and 1720 cm$^{-1}$ which are characteristic absorption of imide and around 1240 cm$^{-1}$ which is the characteristic absorption of ether linkage.

The polyimide powder was inserted between cold rolled steel panels which were preheated at 130° C. and pressed at 320° C. for five minutes with the pressure of 20 kg/cm$^2$.

The lap shear strength of bonded specimen was 300 kg/cm$^2$ at the room temperature and 180 kg/cm$^2$ at 240° C.

Besides the polyamic acid solution above obtained was casted on a glass plate and heated for one hour each at 100° C., 200° C. and 300° C.

The polyimide film thus obtained had a glass transition temperature of 215° C. and a five percent weight decrease temperature of 519° C.

The press-bonded specimen of cold rolled steel panels prepared by use of the film and by the same conditions as in Example 1 had a lap shear strength of 290 kg/cm$^2$ at the room temperature and 180 kg/cm$^2$ at 240° C.

What we claim is:

1. Polyimide consisting essentially of recurring units of the formula:

-continued where the positions of two carbonyl radicals in a benzene ring are meta or para, and R is a tetravalent radical selected from the group consisting of an aliphatic radical having not less than two carbons, cyclo-aliphatic radical, monoaromatic radical, condensed polyaromatic radical, and non-condensed polyaromatic radical wherein aromatic radicals are mutually connected with a bond or a crosslinking function.

2. Polyimide of claim 1 wherein R is a tetravalent radical having the formula

3. A method for preparing polyimide consisting essentially of recurring units of the formula:

where the positions of two carbonyl radicals in a benzene ring are meta or para, and R is a tetravalent radical selected from the group consisting of an aliphatic radical having not less than two carbons, cyclo-aliphatic radical, monoaromatic radical, condensed polyaromatic radical, and non-condensed polyaromatic radical wherein aromatic radicals are mutually connected with a bond or a crosslinking function, which comprises reacting a diamine having the formula:

where the positions of two carbonyl radicals are the same as above with a tetracarboxylic dianhydride having the formula:

where R is the same as above, in an organic solvent, and thermally or chemically imidizing resultant polyamic acid having recurring units of the formula:

where the positions of two carbonyl radicals, and R are the same as above.

4. The method for preparing polyimide of claim 3 wherein R is a tetravelent radical having the formula 5. A high-temperature resistant adhesive consisting essentially of polyimide which consists essentially of recurring units of the formula where the positions of two carbonyl radicals in a benzene ring are meta or para, and R is a tetravalent radical selected from the group consisting of an aliphatic radical having not less than two carbons, cyclo-aliphatic radical, monoaromatic radical, condensed polyaromatic radical, and non condensed polyaromatic radical wherein aromatic radicals are mutually connected with a bond or a crosslinking function.

6. The high-temperature resistant adhesive of claim 5 wherein R is a tetravalent radical having the formula

7. A method for adhesion which comprises applying polyimide which consists essentially of recurring units of the formula where the positions of two carbonyl radicals in a benzene ring are meta or para, and R is a tetravalent radical selected from the group consisting of an aliphatic radical having not less than two carbons, cyclo-aliphatic radical, monoaromatic radical, condensed polyaromatic radical, and non condensed polyaromatic radical wherein aromatic radicals are mutually connected with a bond or a crosslinking function on a substrate, overlapping the applied surface of said substrate with an untreated or applied surface of another substrate, and heating under pressure above the glass transition temperature of said polyimide.

8. The method for adhesion of claim 7 wherein said polyimide is prepared by applying polyamic acid which consists essentially of recurring units of the formula which is a precursor of said polyimide, on a substrate and subsequently imidizing said polyamic acid.

9. The method for adhesion of claim 7 or claim 8 wherein R is a tetravalent radical having the formula

* * * * *